United States Patent [19]
Tieszen et al.

[11] 3,931,421
[45] Jan. 6, 1976

[54] COATING WITH A DISPERSION OF AN ARYLENE SULFIDE POLYMER CONTAINING HIGH MOLECULAR WEIGHT FLUOROCARBON POLYMER

[75] Inventors: Dale O. Tieszen; James T. Edmonds, Jr., both of Bartlesville, Okla.

[73] Assignee: Phillips Petroleum Company, Bartlesville, Okla.

[22] Filed: Sept. 13, 1974

[21] Appl. No.: 505,918

Related U.S. Application Data

[62] Division of Ser. No. 299,145, Oct. 19, 1972, Pat. No. 3,856,736.

[52] U.S. Cl. .............. 427/385; 427/388; 427/421
[51] Int. Cl.² ...................... B05D 3/00; B05D 7/00
[58] Field of Search ...... 117/132 B, 132 CF, 132 A, 117/161 R, 161 UF, 75; 260/26.9 F, 26.9 MQ, 26.9 MN

[56] References Cited
UNITED STATES PATENTS

| | | | |
|---|---|---|---|
| 3,311,494 | 3/1967 | Reinert et al. | 117/75 |
| 3,312,651 | 4/1967 | Daniels et al. | 260/29.6 |
| 3,492,125 | 1/1970 | Ray | 99/1 |
| 3,616,186 | 10/1971 | Blackwell | 161/187 |
| 3,622,376 | 11/1971 | Tieszen et al. | 117/132 B |
| 3,652,327 | 3/1972 | Hill et al. | 117/132 B |
| 3,701,665 | 10/1972 | Grimes et al. | 99/1 |
| 3,819,407 | 6/1974 | Oates et al. | 117/138.8 N |

*Primary Examiner*—P. E. Willis, Jr.

[57] ABSTRACT

High molecular weight fluorocarbon polymer is incorporated into arylene sulfide polymer coating dispersions by (a) dry milling a pigment with the fluorocarbon polymer and (b) thereafter adding the arylene sulfide polymer and a liquid capable of wetting said fluorocarbon-pigment mixture and subjecting same to intensive milling.

14 Claims, No Drawings

3,931,421

COATING WITH A DISPERSION OF AN ARYLENE SULFIDE POLYMER CONTAINING HIGH MOLECULAR WEIGHT FLUOROCARBON POLYMER

This is a divisional of copending application Ser. No. 299,145 filed Oct. 19, 1972, now U.S. Pat. No. 3,856,736.

BACKGROUND OF THE INVENTION

This invention relates to the preparation of arylene sulfide polymer coating dispersions containing high molecular weight fluorocarbon polymer.

Arylene sulfide polymers are known for their desirable characteristics as coating compositions as shown for instance by Ray U.S. Pat. No. 3,492,125. It has been found that in some instances it is preferred to incorporate a small amount of a fluorocarbon polymer with the arylene sulfide polymer coating composition. While relatively low molecular weight fluorocarbon polymer such as that sold by LNP Corporation as TL-126 can be incorporated into such dispersions relatively easily, it has been found that the high molecular weight fluorocarbon polymers are difficult to disperse evenly in an arylene sulfide polymer coating composition.

BRIEF SUMMARY OF THE INVENTION

It is an object of this invention to provide an arylene sulfide polymer coating composition containing a high molecular weight fluorocarbon polymer.

It is a further object of this invention to provide a method for incorporating high molecular weight fluorocarbon polymers in arylene sulfide polymer coating compositions.

And it is yet a further object of this invention to provide an arylene sulfide polymer coating having smooth surface characteristics.

In accordance with this invention, the high molecular weight fluorocarbon polymer is first subjected to intensive dry milling with a pigment and thereafter subjected to intensive milling with the arylene sulfide polymer in a liquid capable of wetting the fluorocarbon-pigment mixture.

DESCRIPTION OF THE PREFERRED EMBBODIMENTS

The instant invention is applicable to the incorporation of any high molecular weight fluorocarbon polymer into arylene sulfide polymer coating compositions. The preferred fluorocarbon polymer is polytetrafluoroethylene (PTFE). The invention makes possible the successful incorporation of fluorocarbon polymers having a high molecular weight. That is, polymers of such molecular weight that no flow is obtained in the ASTM D 1238 melt viscosity test at 380°C using a 5,000 g weight. Probably such polymers have a number average molecular weight of greater than 10 million. These are the types of polymers generally referred to as extrusion or molding grade polymers. Such polymers are sold under trademarks Teflon-5, Teflon-6, Teflon-7, and Halon G-80. The preferred polymers pass the FDA specification for acceptable PTFE (polytetrafluoroethylene) in food service which requires a melt viscosity of at least 10,000 poise at 380°C as determined by ASTM D 1238 and a thermal instability index (TII) of less than 50 as determined by ASTM D 1457.

The invention is applicable to the production of dispersions of any arylene sulfide polymer although the preferred polymer is polyphenylene sulfide having a melting or softening point of at least 300°F, preferably 400°F to 850°F.

The intensive milling used in the dry milling of the fluorocarbon polymer with the pigment and the subsequent milling of this mixture with the liquid and arylene sulfide polymer can be accomplished by the use of a conventional ball mill, a conventional rod mill, or a vibratory ball mill. The balls or rods can be made of steel, ceramic materials such as Burundum, and the like. Both of the operations can be carried out in the same mill or separate mills, including the use of different types of mills for each of the two steps.

It is essential that there be some pigment present when the high molecular weight fluorocarbon polymer is dry milled. The amount of fluorocarbon polymer can vary from 0.02 to 1 part by weight per 1 part by weight of said pigment. About 0.2 to 0.4 parts by weight of fluorocarbon polymer per part of pigment is preferred.

Any pigment capable of withstanding a curing temperature of at least about 300°F, preferably 600–850°F can be utilized. The preferred pigment is titanium dioxide or compositions comprising a major amount of titanium dioxide and a minor amount of another pigment. Other pigments include red iron oxide, black iron oxide, brown iron oxide, carbon black, and zinc oxide.

The liquid in which the pigment-fluorocarbon mixture is thereafter dispersed can be any liquid capable of wetting the mixture. The preferred liquid is water containing a surface active agent. Other suitable liquids include ethylene glycol, propylene glycol, and mixtures of such liquids with water. Any conventional surface active agent can be utilized, however, nonionic surface active agents are preferred.

The ratio of solids (comprising the arylene sulfide polymer, pigment, and fluorocarbon polymer) to liquid can vary depending on the particular coating application; however, it is generally preferred to have a dispersion with about 15–40, preferably 20–40 weight per cent solids.

The intensive dry milling times can vary depending on the type of mixer utilized, with the conventional ball mill or rod mill dry mixing times being at least two days, preferably 4–5 days. With a high speed vibrator with stainless steel balls such as a Vibratom the same intensive milling can be accomplished in about 8–10 hours. At higher ratios of fluorocarbon polymer to pigment, longer times are preferred. For instance, at fluorocarbon polymer to pigment ratios of 0.5 to 1, dry milling times of greater than 2 weeks are desirable. The dry milling step is continued until a free flowing powder is obtained, at which time the material is suitable for further milling with the arylene sulfide polymer in a liquid carrier.

The intensive wet milling can be accomplished in about one-fourth the time required for the dry milling. Preferred times are greater than 8 hours, preferably 16–24 hours.

The ratio of arylene sulfide polymer to fluorocarbon polymer in the final cured coating composition will generally range from 3:1 to 30:1, preferably 5:1 to 20:1.

It is essential that the pigment, fluorocarbon polymer, and arylene sulfide polymer be in a particulate form. In general, the smaller the particle size, the better the dispersions which can be produced. To a major extent the dry milling of the pigment and fluorocarbon polymer tends to break up agglomerates and impregnate the pigment onto the fluorocarbon as opposed to substantially reducing the particle size, although the wet milling of the final composition does appear to reduce the particle size of the arylene sulfide polymer. A suitable particle size for the fluorocarbon polymer is 40 mesh or smaller. The pigment can be the same particle size (40 mesh) or smaller. The arylene sulfide polymer will generally be about 40 mesh or smaller although satisfactory results can be obtained with coarser material, for instance 30 mesh or smaller. As noted hereinabove, the intensive milling will generally reduce the arylene sulfide polymer particle size with the final particle size generally being below 100 mesh. (Standard U.S. Sieve Series)

The final dispersion can be applied to a substrate by any conventional means such as spraying, or with a doctor blade or the like.

The resulting coating can be cured, for instance by heating to a temperature of at least 500°F, preferably at least 600°–850°F for at least 5 minutes, preferably 15 minutes to 2 hours. Alternatively, the coatings can be cured at higher temperatures for shorter times.

The resulting coatings are smooth and have good non-stick characteristics.

EXAMPLE

Dispersions of polyphenylene sulfide having an inherent viscosity of about 0.15 as determined using 0.25 per cent of the sample in chloronaphthalene at 206°C, and a particle size of less than 60 mesh, were made with four separate fluorocarbon polymers (Runs 1–6) having a melt viscosity of 0° at 380°C (zero flow) as determined by ASTM D 1238 using a 5,000 g weight. These polymers were marketed under the trademarks Teflon-5, Teflon-6, Teflon-7, and Halon G-80. The Teflon polymers had an average particle size of 325, 500, and 35 microns, respectively. Also blends of predominantly high molecular weight polytetrafluoroethylene (Runs 7–8) were used. Each fluorocarbon polymer was milled in a laboratory ball mill or vibratom (vibratory ball mill) utilizing one part fluorocarbon polymer to three parts by weight of pigment as set out hereinbelow:

| Run | Fluorocarbon Polymer | Dry Milling Period (Hr.) | Type of Mill Used | Pigment[a] |
|---|---|---|---|---|
| 1 | Halon | 118 | ball mill | $TiO_2$ |
| 2 | Halon | 17 | vibratom | $TiO_2$ |
| 3 | Teflon-5 | 114 | ball mill | $TiO_2$ |
| 4 | Teflon-5 | 10 | vibratom | $TiO_2$ |
| 5 | Teflon-6 | 96 | ball mill | $TiO_2$ |
| 6 | Teflon-7 | 89 | ball mill | red iron oxide |
| 7 | 75% Teflon-7/25% PTFE TL-126 | 48 | ball mill | $TiO_2$ |
| 8 | 75% Teflon-7/25% PTFE TL-126 | 72 | ball mill | $TiO_2$ |

[a]$TiO_2$ was DuPont's R-101 grade

Thereafter polyphenylene sulfide and a one percent aqueous solution of a non-ionic surface active agent sold under the trademark Triton X-100 were added to the pigment-fluorocarbon mixture to give 3 parts phenylene sulfide for each part pigment. This mixture was ball milled for about 16 hours. The resulting dispersions contained 30 per cent solids. Each dispersion was sprayed with a Binks model 18b spray gun onto 3 × 6 × 0.020 inch aluminum alloy coupons which had been degreased by washing in acetone and blasted with number 100 abrasive. The resulting coatings were cured at 700°F for 30 minutes. Coating thicknesses were between 0.75 mil and 1.5 mils. The resulting coatings were smooth and had good non-stick characteristics. In other runs, smooth coatings were obtained with two days' dry milling. As can be seen from Runs 7 and 8, with the Teflon-7/TL-126 polymer blend smooth coatings were obtained, respectively, after 2 days' and after 3 days' dry milling.

CONTROL I

A similar dispersion to that of Run 6 of the Example was made except the polytetrafluoroethylene-pigment mixture was ball milled for only one day. The resulting coating had a rough appearance and poor release properties. As measured by a contact angle Goniometer, Model A-100, contact angle after 30,000 strokes of brushing was 44° with Wesson oil. The coatings of the Example had contact angles of greater than 50 under identical testing. A similar run to that of Runs 7 and 8 of the Example in which the ball milling was for only one day gave a coating having a rough appearance.

CONTROL II

Similar dispersions to those of the Example were made except the polyphenylene sulfide, polytetrafluoroethylene, titanium dioxide, and aqueous surface active agent solutions were all ball milled together for various times up to 7 days. The resulting coatings in each case were rough. Additional dispersions were made wherein all ingredients mixed together except utilizing low molecular weight fluorocarbon polymers such as TL-126 which decomposes in the TII test and has a melt viscosity at 380°C of $4 \times 10^3$. These dispersions have a smooth coating although not quite as good as those made from high molecular weight fluorocarbon polymer in accordance with the invention.

While this invention has been described in detail for the purpose of illustration, it is not to be construed as limited thereby but is intended to cover all changes and modifications within the spirit and scope thereof.

What is claimed is:

1. A process for forming a coated article comprising: applying to a substrate a dispersion formed by subjecting fluorocarbon polymer, in particulate form, having a molecular weight sufficient to give a melt viscosity flow of 0° at 380°C using a 5000 g. weight, to intensive dry milling by ball milling or rod milling with a pigment in particulate form; and thereafter subjecting the resulting mixture to intensive milling by ball milling or rod milling with poly (arylene sulfide) in particulate form in a liquid selected from water, ethylene glycol, or propylene glycol, and heating said thus applied dispersion at a temperature of at least 500°F to form a cured coating.

2. A method according to claim 1 wherein said fluorocarbon polymer is polytetrafluoroethylene.

3. A method according to claim 2 wherein said liquid is water containing a surface active agent.

4. A method according to claim 3 wherein said poly(arylene sulfide) is polyphenylene sulfide.

5. A method according to claim 4 wherein said pigment is titanium dioxide.

6. A method according to claim 4 wherein said pigment, fluorocarbon polymer and arylene sulfide particles each have a particle size of less than 40 mesh.

7. A method according to claim 4 wherein a ratio of said polyphenylene sulfide to polytetrafluoroethylene is within the range of 5:1 to 20:1, and the total solids content is within the range of 20–40 weight per cent based on the total weight of said dispersion.

8. A method according to claim 4 wherein said intensive dry milling is done for a time period of greater than 2 days and said intensive milling with said liquid is done for a time of greater than 8 hours.

9. A method according to claim 1 wherein said fluorocarbon is present in an amount within the range of 0.02 to 1 part by weight per 1 part by weight of said pigment and a ratio of said poly(arylene sulfide) to fluorocarbon polymer is within the range of 3:1 to 30:1 and wherein the total solids content is within the range of 15 to 40 weight per cent based on the total weight of said dispersion.

10. A method according to claim 1 wherein said intensive dry milling is done for a time period of greater than 2 days.

11. A method according to claim 1 wherein said intensive dry milling is done by vibratory ball milling for a time period of greater than 8 hours.

12. A method according to claim 1 wherein said dispersion is applied by means of spraying.

13. A method according to claim 1 wherein said thus applied dispersion is heated to a temperature within the range of 600–850°F for a time within the range of 15 minutes to 2 hours to effect said cure.

14. A coated article formed by the process of claim 1.

* * * * *